United States Patent
Laiho et al.

(10) Patent No.: US 7,558,585 B2
(45) Date of Patent: Jul. 7, 2009

(54) METHOD OF GATHERING LOCATION DATA OF TERMINALS IN A COMMUNICATION NETWORK

(75) Inventors: Jaana Laiho, Veikkola (FI); Wolfgang Steffens, Veikkola (FI)

(73) Assignee: Nokia Corporation, Espoo (FI)

( * ) Notice: Subject to any disclaimer, the term of this patent is extended or adjusted under 35 U.S.C. 154(b) by 27 days.

(21) Appl. No.: 10/468,435

(22) PCT Filed: Dec. 21, 2001

(86) PCT No.: PCT/EP01/15255

§ 371 (c)(1),
(2), (4) Date: Aug. 19, 2003

(87) PCT Pub. No.: WO03/055250

PCT Pub. Date: Jul. 3, 2003

(65) Prior Publication Data

US 2004/0067758 A1    Apr. 8, 2004

(51) Int. Cl.
H04W 24/00    (2006.01)
(52) U.S. Cl. .................. 455/456.5; 455/457; 455/456.1
(58) Field of Classification Search .................. 455/453, 455/456.1, 456.2–456.6, 436, 414.1, 414.2, 455/433

See application file for complete search history.

(56) References Cited

U.S. PATENT DOCUMENTS 5,422,933 A * 6/1995 Barnett et al. ............... 455/439
5,697,054 A * 12/1997 Andersson ................... 455/524
5,796,722 A * 8/1998 Kotzin et al. ................. 370/252
6,148,199 A * 11/2000 Hoffman et al. ............. 455/433
6,295,454 B1   9/2001 Havinis et al.
6,308,071 B1 * 10/2001 Kalev ......................... 455/446

(Continued)

FOREIGN PATENT DOCUMENTS

WO    WO 00/30384    5/2000

OTHER PUBLICATIONS

3 GPP TS 25.305 V3.6.0 (Jun. 2001); $3^{rd}$ Generation Partnership Project; Technical Specification Group Radio Access Network; State 2 Functional Specification of UE Positioning in UTRAN; Release 1999; pp. 1-48.

(Continued)

*Primary Examiner*—Charles N Appiah
*Assistant Examiner*—Jaime M Holliday
(74) *Attorney, Agent, or Firm*—Squire, Sanders & Dempsey L.L.P.

(57) ABSTRACT

The present invention concerns a method of gathering location data of terminals in a communication network, the network comprising at least one location determination functionality adapted to determine data indicative of the location of a specified terminal within the network, and a control functionality adapted to control at least the location determination functionality, the method including: acquiring location data of specified terminals in response to corresponding requests from a service application, monitoring a load condition of the at least one location determination functionality resulting from the acquiring of location data of specified terminals, first detecting that the monitored load condition is below a certain threshold value, second detecting that a predetermined event concerning at least one terminal has occurred, and collecting location data of terminals in response to the second detecting.

34 Claims, 4 Drawing Sheets

U.S. PATENT DOCUMENTS

| | | | |
|---|---|---|---|
| 6,360,102 B1 * | 3/2002 | Havinis et al. | 455/457 |
| 6,415,153 B1 * | 7/2002 | Liew | 455/453 |
| 6,577,871 B1 * | 6/2003 | Budka et al. | 455/453 |
| 6,631,270 B1 * | 10/2003 | Dolan | 455/453 |
| 6,721,567 B1 * | 4/2004 | Wang et al. | 455/440 |
| 6,771,963 B1 * | 8/2004 | Cheng et al. | 455/437 |

OTHER PUBLICATIONS

3G TR 25.923 V1.0.0 (Apr. 1999); $3^{rd}$ Generation Partnership Project (3GPP); Technical Specification Group (TSG) RAN; Working Group 2 (WG2); Report on Location Services (LCS); pp. 1-46.

* cited by examiner

METHOD OF GATHERING LOCATION DATA OF TERMINALS IN A COMMUNICATION NETWORK

FIELD OF THE INVENTION

The present invention relates to a method of gathering location data of terminals in a communication network.

BACKGROUND OF THE INVENTION

With recent progress in communication technology, services offered by communication network operators to the subscribers thereto have also gained more attention. Among such services, so-called location based services (LCS) find considerable attention. For example, a subscriber may have subscribed to a service providing the subscriber with up-to-date traffic information via the network to his communication terminal. To this end, however, in order to provide the proper information to the subscriber, it is inevitable to know the subscriber's location within the network. Stated in other words, a subscriber currently being located in the Berlin area does not need to receive traffic information concerning the Helsinki area. Likewise, having subscribed to a yellow page service requires a knowledge of the subscriber's position within the network in order to provide him "only" with the relevant yellow page entries.

As mentioned above, the present invention is concerned to gather such location information on the location of a terminal attached and/or registered to a communication network.

In this connection, it has to be noted that the present invention as subsequently described is applicable to any communication network as long as terminals may change their position within the communication network. Thus, the network may support the use of e.g. mobile terminals in the sense of wireless terminals or even some kind of "fixed" (i.e. non-wireless) terminals which may however be connected ("plugged-in") at different locations within the network. The expression terminal as used herein is intended to cover any such type of subscriber equipment. Likewise, also the communication network as such is not limited to a certain type of communication network. For purposes of describing the present invention, however, the subsequent description refers to a WCDMA (WCDMA=Wideband Code Divisional Multiple Access) radio communication network also known as 3G UMTS (3G=$3^{rd}$ generation, UMTS=Universal Mobile Telecommunication System) network. Nevertheless, other communication networks based on other or similar transmission principles (such as FDMA (Frequency Division Multiple Access) and/or TDMA (Time Division Multiple Access) are also suitable for the present invention being implemented thereto.

Figure 1:
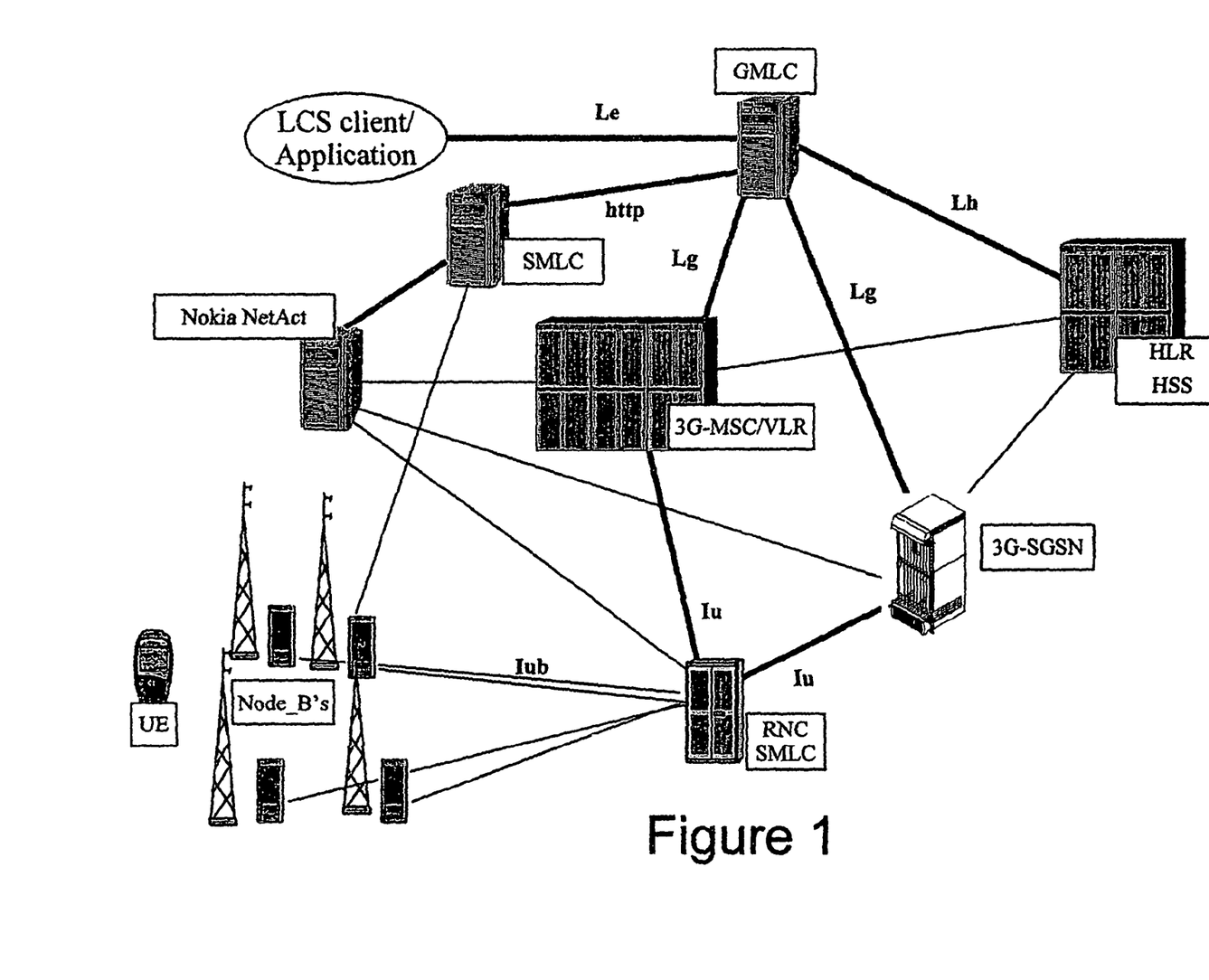
FIG. 1 shows a typical example of at least those parts of the communication network architecture which are involved when the present invention is implemented.

FIG. 1 shows a typical example of at least those parts of the communication network architecture which are involved when the present invention is implemented to the communication network. The illustrated example in FIG. 1 refers to the 3G UMTS network architecture.

As shown, a terminal also known as user equipment UE is adapted to communicate via the network. Note that for communication the user equipment UE has at least to be registered to the network in a subscriber database (HLR/HSS) and attached to a communication network. "Attached" here means a state of the user equipment in which it is switched on and it is known to the network that the user equipment UE terminal is (in principle) "ready" for communication even if currently idle.

In communication, the user equipment UE accesses the network infrastructure via an air interface (not expressly shown). More precisely, the terminal UE exchanges signals with a radio transceiver device referred to as Node_B (in UMTS) (corresponding to Base Station BS in GSM). Each Node_B has a certain coverage area within which communication with the Node_B is enabled. The coverage area is also referred to as a cell. Each cell is identified by at least a cell identifier. Optionally, a cell identifier CI can be supplemented by a location area identifier LAI. The entire communication network area is thus composed of a plurality of cells. The location of Node_B's is defined upon network planning. Thus, a network management/planning system functional entity has a knowledge of the network topology and also of the cell identifiers corresponding to the respective Node_B's.

A group of Node_B's are controlled by a radio network controller RNC (corresponding to base station controller BSC in GSM). Of course, although not shown in FIG. 1, more than one RNC can be present in the network depending on its size/area covered. In order to keep the illustration simple, however, only one RNC has been shown. Note that a RNC represents an access control entity of said network, which is currently in charge of controlling access-of said terminal to said network.

Further, one or more RNC's are grouped for being controlled by a mobile services switching center MSC (3G-MSC) serving as a routing entity currently in charge of routing messages for said terminal. This means that the MSC switches calls/connections concerning a terminal of interest in that the MSC "selects" the proper RNC controlling the proper Node_B via which the terminal communicates. Depending on the size of the network, of course more than one MSC are present. A moving and/or roaming terminal may thus be present in the area of a MSC which may also be referred to as "visited MSC" VMSC. Associated to a VMSC there is a VLR (Visitor Location Register (in GSM) or its 3G equivalent functionality.

Note that in 3G UMTS networks not only speech (as an example of real-time data) are transmitted, but also packet data (as an example on non-real-time data) are transmitted. Packet data transmission takes place via a so-called GPRS (General Packet Radio Service) network existing "in parallel" and comprising SGSN (Serving GPRS Support Node) and GGSN (Gateway GSN) nodes. In the GPRS, the SGSN corresponds in functionality and hierarchical location within the network to the VMSC explained above.

Connected to the MSC/SGSN (which in FIG. 1 are shown as distributed entities) is a location determination functional entity SMLC which as shown is located in close relation to the RNC (although this is not absolutely necessary). A distributed SMLC may also be directly connected to the Node_B's. The MSC/SGSN and SMLC may in turn be connected to a gateway entity GMLC (Gateway Mobile Location Center). The SMLC, MSC/SGSN may further be connected to the network planning/management system mentioned earlier above (NetAct). Note that NetAct is a product name of a product of the applicant, which product name denotes an example product of a system provisioned with network management functionalities and/or a network management system. Thus, any mention of NetAct is intended as an example of such a product and refers in general to a network management system without restricting it to the actual product NetAct.

Also, it is to be noted that any network planning is effected in terms of network optimization. Hence, any reference to a network planning method/system of course implies that network optimization is involved in planning.

The GMLC has a connection to a subscriber register HLR (Home Location register) and/or HSS (Home Subscriber Server) keeping a record of subscribers having subscribed to the network and the services available to them. In addition, the GMLC provides for a gateway functionality offering a connection to the "outside" of the network, where an application (e.g. run on a computer device) is located. (The application may be associated to a service control point entity SCP of the network (not shown).)

Signaling between GMLC-SMLC and SMLC-MSC/SGSN is, for example, achieved using MAP3/SS7 (Mobile Application Part 3/Signaling System No. 7) in circuits switched as well as in packet switched networks, as shown in FIG. 1.

Note that the entirety of the SMLC, GMLC and other network elements such as middleware components and interfaces involved in determination of the position of terminals is also referred to as "positioning estimation and information machine" and/or location determination functionality in the context of the present application. The location determination functionality is under control of an associated control functionality adapted to control at least said location determination functionality, and which control functionality (not separately shown in FIG. 1) may be spatially concentrated at the SMLC and/or GMLC or spatially distributed within the network.

So far, the network architecture has roughly been described in order to simplify understanding of the invention. Of course, the entities described above may perform additional. functions as compared to those briefly highlighted above. However, a full description of the capabilities and interrelations and the interfaces there between can not be given in the framework of the present patent application. Rather, the reader is referred to the corresponding standards published by 3GPP ($3^{rd}$ Generation Partnership Project) and/or ETSI (European Telecommunication Standards Institute).

In a further approach, the applicant of the present invention conceived to fetch network parameters from the base station controller BSC and/or radio network controller RNC using location based services LCS standard messages. (Note that with Camel ATI mentioned earlier above only Cell ID or SAI can be fetched from MSC/SGSN.)

The 3GPP standards are describing in a very detailed manner a variety of positioning methods and their retrieval methods. In addition to those, there might be vendor specific enhanced non-standard methods. This invention is not limited to a particular method nor is it important to understand whether the radio network or the terminal are answering either x, y coordinates or proprietary messages via the circuit switched or packet switched core network to the requesting entity, which could be GMLC or MSC. The location determination functionality and especially the SMLC functionality as such can be distributed throughout the network providing the x,y coordinates one way or another.

In general, location data of specified terminals is acquired in response to corresponding requests from a service application. However, for the present invention it is not crucial in which specific way the position information related to a specified terminal is determined as long as it is determined by means of the location determination functionality.

Acquiring the location data by means of the location determination functionality requires quite some processing capacity due to signaling/calculating to be performed in connection therewith. The entire location determination functionality has therefore been dimensioned to get along with a specified maximum of location determination requests that can be expected to simultaneously occur in practice.

This rated (maximum) processing capacity, however, is not constantly used as the maximum number of requests is not constantly reached but occurs rather seldom. Hence, at least part of the overall available processing capacity of the location determination functionality remains unused most of the time.

From an economical point of view, this is, however, inconvenient for a network operator having provisioned his network with a location determination functionality.

SUMMARY OF THE INVENTION

Consequently, it is an object of the present invention to provide a method of gathering location data of terminals in a communication network which is free from the above mentioned drawbacks.

According to the present invention, this object is for example achieved by method of gathering location data of terminals in a communication network, the network comprising at least one location determination functionality adapted to determine data indicative of the location of a specified terminal within said network, and a control functionality adapted to control at least said location determination functionality, said method comprising the steps of: acquiring location data of specified terminals in response to corresponding requests from a service application, monitoring a load condition of said at least one location determination functionality resulting from said acquiring of location data of specified terminals, first detecting that said monitored load condition is below a certain threshold value, second detecting that a predetermined event concerning at least one terminal has occurred, and collecting location data of terminals in response to said second detecting.

Also, according to the present invention, this object is for example achieved by a system for gathering location data of terminals in a communication network, the network comprising at least one location determination functionality adapted to determine data indicative of the location of a specified terminal within said network, and a control functionality adapted to control at least said location determination functionality, said system comprising: an acquisition functionality adapted to acquire location data of specified terminals in response to corresponding requests from a service application, said control functionality comprising a monitoring means adapted to monitor a load condition of said at least one location determination functionality resulting from said acquiring of location data of specified terminals, a first detection means adapted to detect that said monitored load condition is below a certain threshold value, a second detection means adapted to detect that a predetermined event concerning at least one terminal has occurred, and a collection functionality adapted to collect location data of terminals in response to said second detecting.

According to advantageous further refinements of the present invention (method and/or system), said threshold value is defined as a percentage of the maximum processing capacity of said at least one location determination functionality, said threshold value is predefined and fixed, said threshold value is dynamically defined, said threshold value varies dependent on time, said predetermined event concerns an arbitrary one of terminals registered to said network, said predetermined event comprises at least one network condition to be exploited for network management and optimization purposes, said predetermined event comprises at least one of the following conditions terminal requesting active set update, terminal performing intersystem handover, terminal performing traffic reason handover, terminal with frequent handovers, terminal commanded to reduce bit rate, terminal using a specified service, collected location data of terminals is statistical data, said collected location data of terminals are subjected to a further step of removing terminal identification information so as to be represented anonymously, an event is judged to have occurred if said condition is fulfilled for at least a predetermined minimum number of arbitrary terminals, said predetermined event is the lapse of a predetermined period of time, said threshold value varies dependent on the monitored load condition, for network management purposes the location of terminals is analyzed per event or combinations of events.

Accordingly, by virtue of the present invention being implemented in a communication network and/or the control functionality of the location determination functionality, the following advantages can be realized:

the usage of the overall available processing capacity of the location determination functionality is optimized, in that spare capacity of the network (i.e. the location determination functionality) is used to provide additional information on the location of terminals to be exploited for e.g. network optimization, a network operator having provisioned his network with a location determination functionality may use this functionality with increased economical efficiency, since the location data of terminals collected in response to said second detecting can be used for other purposes such as network planning and optimization, the collected location information is statistical and anonymous and does not cause additional costs to the subscriber/user of a terminal, due to using the collected data for network planning and optimization, the costs for running the network can be reduced, the optimization process can be based on a new dimension and/or variable, i.e. location, which offers more precise information (with higher spatial resolution) as compared to the former cell-based network optimization, no additional hardware/software costs will arise for the network operator, since the location determination functionality is already implemented in the network while its usage is only optimized according to the present invention, the present invention is applicable to any communication system utilizing a terminal location determination functionality.

BRIEF DESCRIPTION OF THE DRAWINGS

The present invention is subsequently described in greater detail with reference to the accompanying drawings, in which.

DETAILED DESCRIPTION OF THE EMBODIMENTS

The present invention will be more readily understood when referring to the following detailed description thereof in conjunction with the accompanying drawings.

In brief, according to the present invention, spare capacity of the Gateway Mobile Location Center (GMLC), Serving Mobile Location Center (SMLC), interfaces and other positioning related network elements (NE) and/or other functional entities, in their entirety referred to as location determination functionality, is used effectively in the network optimization process. The Serving Mobile Location Center SMLC describes a functional block that provides location information to location-based services. The SMLC computes the location coordinates (e.g. latitude/longitude) of a subscriber's handset/terminal. The GMLC is a gateway that receives the mobile position information from the network and transfers the information to the location applications involved. The GMLC receives the location queries/requests from (authorized) applications, processes them, and replies with the position information. Enabling Mobile Location Center (EMLC) or other middleware components can have the capability to translate it to location area information (such as city name or postal code) from position data. Further, those entities interface to other positioning related elements and ensure different positioning related tasks such as security, privacy and collecting history into database etc. However, these related tasks such as security, privacy are not relevant as such for the present invention and a description thereof is therefore omitted. In connection with the present invention, it is proposed that the SMLC (and other relevant network elements for the location determination process) is provided with performance counters (and/or performance measurement units), which inform about the utilization level of the relevant network elements. Furthermore it is proposed that one or more configuration parameter(s) (referred to as load condition threshold value) (which can be a constant value, say e.g. 70% of the rated processing capacity, or can be defined dynamically as a function of e.g. time) is introduced to provide a reference for the load condition of the location determination functionality, under which threshold value event triggered positioning, e.g. for network optimization purposes, is possible. The list of such "events" can be endless. For example, an event may reside in mobile station requesting active set update, mobile station performing intersystem handover (HO), mobile station performing traffic reason HO, mobile station with frequent HOs, mobile station commanded to reduce bit rate, mobile station using a specific service (for example, a service can be a UMTS traffic class, a certain PDP context, possibly also some end-to-end service like yellow pages, pizza service or the like). (this measurement is important information source in terms of coverage area vs. served bit rate/service). The above list of events is intended as an example only and not limiting the events applicable in connection with the present invention. Practically, any event which may occur in connection with a terminal registered/attached to a communication network may be exploited as an event triggering collecting of location data of terminals in response to said triggering. The information collected is "statistical", i.e. not IMSI (International Mobile Subscriber Identity) and/or IMEI (International Mobile Equipment Identity) specific. Stated in other words, the collected information is anonymous. This in turn means that for example the collected information is represented as colored areas on a network map where a certain service was used or where handover triggering happened, but we do not know who was using the service/who was commanded to handover. Also, an event as such as mentioned above may be combined with a threshold number of terminals for which said event occurred. Note that "SMLC" is to be understood that it contains all entities, interfaces, HW, SW etc. related to the positioning estimation and the delivery of the positioning information. In real implementation it can be that several location related load indicators are monitored as the location determination functionality may be provisioned in the network centralized or spatially distributed. The optimizer and/or network planning and management system is utilizing the existing network and position estimate & information machine consisting of entities such as GMLC, SMLC, interfaces, middleware and other functional blocks in order to optimize the network with the usage of collected terminal location information. The optimizer is providing event thresholds and/or triggers to the network, so that the network can inform the location determination functionality about the occurrence of those events (i.e. request collecting of location information). The events are then triggering the location determination functionality to calculate the actual terminal position in case of "free" processing capacity (below the load threshold). The event related position is fed back to the optimizer. Now the optimizer uses the information for network optimization. The service order related position can be understood as the terminal position when the service was requested or it can be periodic UE position information, which is provided as a part of the service. Services, which are based on events or periodic location information, can also be used to retrieve terminal location for the purpose of network optimization. It is to be noted that the optimizer functionalities may be in a network management system, but also in a base station controller BSC and/or a radio network controller RNC (or other relevant network element).

Figure 2:
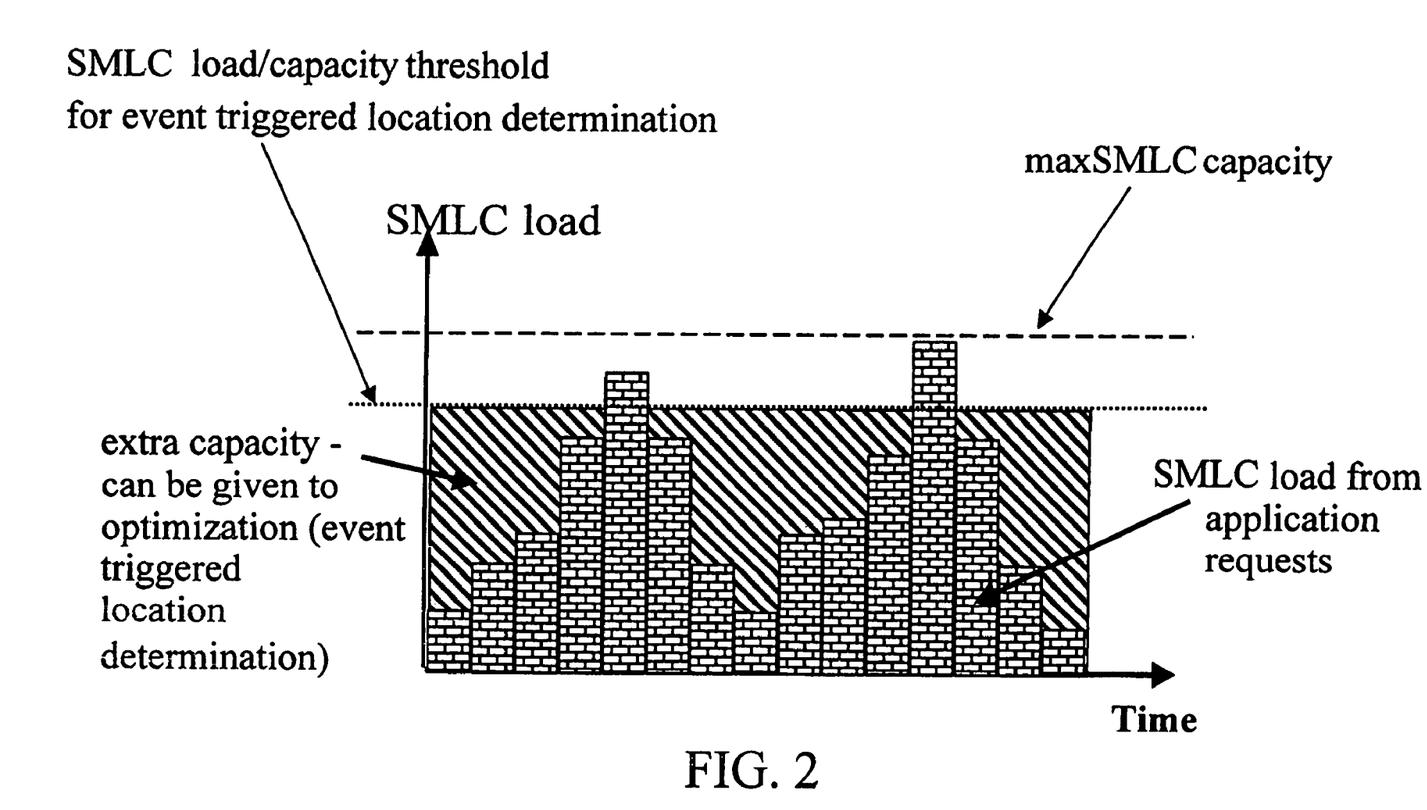
FIG. 2 illustrates a diagram showing the location determination functionality's load ("SMLC load") versus time, FIGS. 3 and 4, respectively, show in rough outline entities and/or groups of entities in connection with the present invention and interfaces there between, used for explaining a basic signaling scenario.

FIG. 2 illustrates a diagram showing the location determination functionality's load ("SMLC load") versus time. The SMLC load here denotes the load of the location determination functionality. This means either the processing load for the entirety of involved entities, or the processing load imposed on a part of the entirety (e.g. in case of spatially distributed location determination functional entities. A maximum SMLC processing capacity (rated capacity) is denoted by maxSMLCcapacity and indicated by a broken line. Below said maximum, a threshold level indicated by a dotted line is defined, the threshold being used for event triggered location determination. Said threshold value is defined as a percentage of the maximum processing capacity of said at least one location determination functionality. Note that although the expression "percentage" is used herein, it is intended to denote in general a share or portion of the maximum processing capacity which need not necessarily be expressed in percents. According to FIG. 2, said threshold value is predefined and fixed. Nevertheless, according to a modification (not shown) it is possible to define said threshold value dynamically. In such a case, said threshold value varies for example dependent on time (the variation may be stepwise or gradually). Additionally or alternatively, said threshold value may vary dependent on the monitored load condition.

The processing load is composed of two components.

One component is the processing load originating from location determination requests issued by location based services LCS. This component is indicated by the individual bars represented with a brickwall pattern in FIG. 2. Based on these requests, the location determination functionality acquires location data of specified terminals in response to corresponding requests from a service application. A specified terminal here means an identified terminal (e.g. by its IMSI or IMEI or any other identification information).

The second component is the processing load originating from event triggered location determination. The second component may, however, only be present in case the first component does not exceed the threshold level. That is, while acquiring location data of specified terminals in response to corresponding requests from a service application, there is performed a monitoring of the load condition of said at least one location determination functionality which results from said acquiring of location data of specified terminals. Also, there is performed a first detecting that said monitored load condition is below a certain threshold value. If so, there is performed a second detecting that a predetermined event concerning at least one terminal has occurred, and collecting location data of terminals is performed in response to said second detecting. The second component is illustrated as a hatched portion in the diagram shown in FIG. 2.

Practically, any event which may occur in connection with a terminal registered/attached to a communication network may be exploited as an event triggering/initiating collecting of location data of terminals as long as said predetermined event comprises at least one network condition of interest for/to be exploited for network management and optimization purposes. In particular, those events as listed above may be used in said second detecting. The predetermined event may concern an arbitrary one of terminals registered to said network. Nevertheless, an event may be judged to have occurred, if the condition is fulfilled for at least a predetermined minimum number of arbitrary terminals. Also, the event may reside in the lapse of a predetermined period of time.

As a result of collecting location data of terminals, statistical data of location data of terminals is obtained. This means that said collected location data of terminals are subjected to a further step of removing terminal identification information so as to be represented anonymously.

Then, the collected data can be graphically represented as one or more maps showing a spatial distribution of respective events, even with a sub-cell resolution. Stated in other words, for network management purposes the location of terminals is analyzed per event, or combination of events. This does not only enable network optimization on a cell level, but also a network optimization which takes into account the specific situation due to a terminal distribution within a respective cell. By means of such a representation, so-called "hot-spots" for specified events can be discovered within the network and suitable countermeasures can be initiated in terms of network planning and management to "smoothen" and/or improve the situation in the "hot-spots". It is to be noted that network planning does not represent the sole field of usage of the collected location information, rather these could also be used for business planning purposes and the like.

As shown in FIG. 2, nearly all the time the processing capacity of the SMLC can be used up to the threshold for both purposes, acquiring location data of specified terminals in response to corresponding requests from a service application as well as collecting (statistical) location data of terminals. Only in case the processing load exceeds the threshold level already because of requests originating from location based services, collecting of statistical location data is prevented in order to assure proper functioning of the location based services. The range between the threshold and the maximum capacity can be regarded as a safety margin in order to get along also with peaks in requests of location based services.

Figure 3:
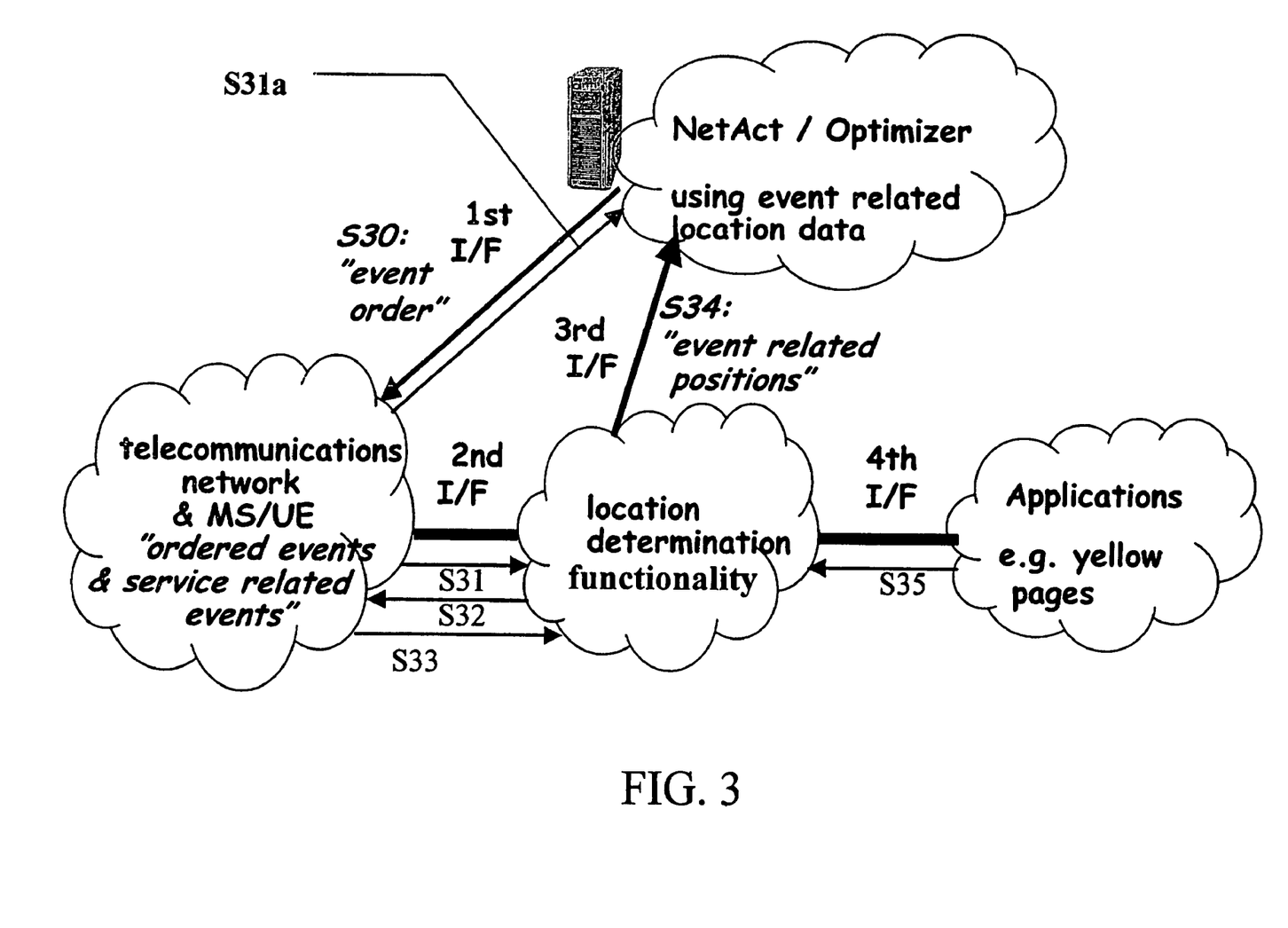
Figure 4:
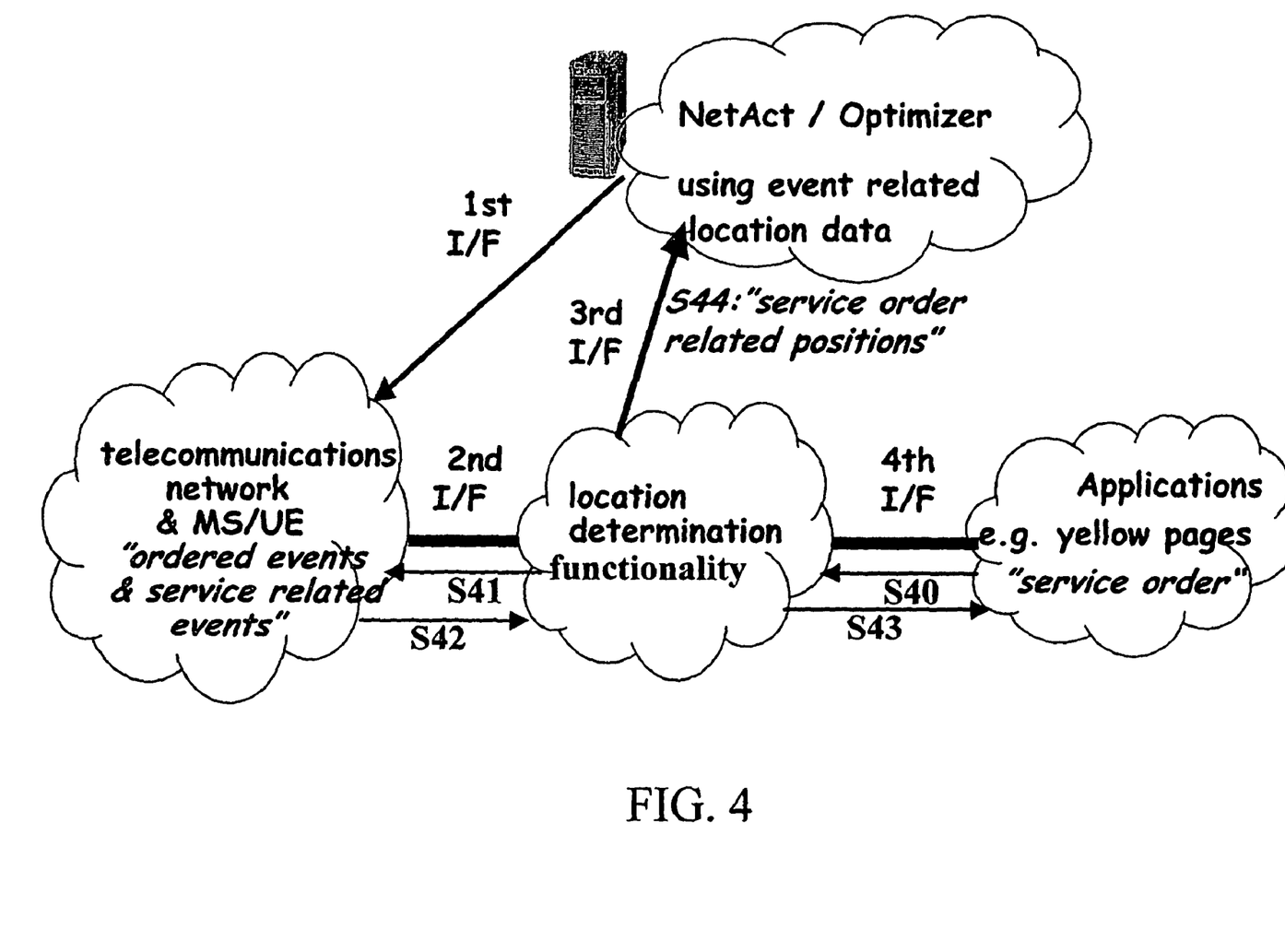

FIGS. 3 and 4, respectively, show in rough outline entities and/or groups of entities in connection with the present invention and interfaces there between, used for explaining a basic signaling scenario. It is to be noted that this illustration is a simplified representation of FIG. 1 and the entities shown in FIGS. 3 and 4 are slightly re-grouped and summarized for explanatory purposes.

FIGS. 3 and 4 each shows a network management/planning system denoted by NetAct/optimizer, which is adapted to use also event related terminal location data (apart from "conventional" data (without terminal location information) obtained for network planning purposes). The NetAct/optimizer is adapted to communicate with the communication network/terminals via a first interface, and with the location detection functionality via a third interface. A second interface is provisioned between the communication network and the location detection functionality. A fourth interface is provisioned between the location detection functionality and applications.

Now the signaling involved in connection with the present invention will be roughly described.

FIG. 3 represents the signaling in connection with the collecting of event related terminal locations. Initially, the NetAct/optimizer informs the network via the first interface of the event and/or events to be detected, S30: "event order". In this regard, an event manager is used to order the event e.g. Soft Handover—when such an event occurs for terminal(s), the telecommunication network:

in case A—is requesting the position of those terminals from the location determination functionality (S31). The location determination functionality is checking the load of its elements and is performing the calculation if the load is below threshold. In case the load is above the threshold and the calculation can not be performed, it is possible to use a negative acknowledgement (S32).

in case B—will verify free capacity from the location determination functionality before the request of the location (S31). The location determination functionality will acknowledge positive or negative dependent whether the load is above or below the threshold (S32). In case of a positive answer meaning the location determination functionality has free capacity, the telecom network will send the location request of the terminal(s) to the location determination functionality (S33). The position of the terminals can be sent either directly to the NetAct (S34) or via the telecom network (S36) to the NetAct (S31a). The combination of the event(s) and the position information is done by NetAct/optimizer e.g. via GIS (Geographic Information System).

Upon occurrence of said event, the network informs the location determination functionality via the second interface of the detected event, S31. Optionally, in a step S31a, also the NetAct/optimizer is informed via the first interface of the occurrence of the event. Since the location determination functionality (more precisely, its control functionality) monitors a load condition of said one location determination functionality resulting from acquiring of location data of specified terminals (to be described with reference to FIG. 4), it performs first detecting that the monitored load condition is below a certain threshold value. If this is confirmed, the information on the occurrence of the event (S31), triggers and/or initiates the second detecting that a predetermined event concerning at least one terminal has occurred, and the collecting of location data of terminals in response to said second detecting, S32. Event related information, which is used in the location determination functionality to determine the position, are then supplied, S33, via the second interface from the network to the location determination functionality and further via the third interface from the location determination functionality to the NetAct/optimizer, S34.

The applications are not directly involved in this scenario, while it has to be kept in mind that requests for location determination of specified terminals from the applications via the fourth interface to the location determination functionality, S35, contribute to an increase in the processing load of the location determination functionality.

Namely, as shown in FIG. 4, requests for location determination of specified terminals are issued from the applications via the fourth interface to the location determination functionality, S40 (similar to S35), and contribute to an increase in the processing load of the location determination functionality. The location determination functionality requests the position related information. This information is used in the location determination functionality to conclude the location/position of the specified terminal from the network, S41, which returns the necessary information, S42 to the location determination functionality which on the basis thereof determines the location of the specified terminal. The determined/acquired location is then supplied to the requesting application, S43. On the other hand, the identification information is removed from this location information and the determined/acquired location in anonymous form is also supplied to the NetAct/optimizer, S44.

Note that in practice both scenarios as described in connection with FIGS. 3 and 4 are simultaneously active in the network, while their description has been separated for explanatory purposes only.

Although herein above the present invention has mainly been described with a focus on a method, it is to be understood that the present invention also concerns a system for gathering location data of terminals in a communication network, the network comprising at least one location determination functionality adapted to determine data indicative of the location of a specified terminal within said network, and a control functionality adapted to control at least said location determination functionality, said system comprising: an acquisition functionality adapted to acquire location data of specified terminals in response to corresponding requests from a service application, said control functionality comprising a monitoring means adapted to monitor a load condition of said at least one location determination functionality resulting from said acquiring of location data of specified terminals, a first detection means adapted to detect that said monitored load condition is below a certain threshold value, a second detection means adapted to detect that a predetermined event concerning at least one terminal has occurred, and a collection functionality adapted to collect location data of terminals in response to said second detecting.

Of course, the monitoring and/or first/second detection means may be realized in hardware or software.

Accordingly, gathering of the positioning data according to the present invention is preferably event triggered and the combination of the event and the position data is used for network optimization or other purposes. Furthermore, the event triggering is preferably only used when the positioning machine is not otherwise "busy", "busy" being judged according to a configuration parameter (threshold) which can be adjusted by Operator/client/ . . . or it can be set automatically based on collected experiences. According to the present invention, the position information is used in the optimization, while no additional costs are caused.

It should be noted that the network elements (like SGSN, GGSN, GMLC, SMLC etc . . . ) are not limiting the scope of the invention, and it does not matter what the "positioning machine"/location determination functionality consists of, as long as such a functional entity (which may even be distributed) exists and there is a means to detect the loading of the entity. Also, the optimizer is the entity that could use the gathered/collected information, it can be at RNC, BSC or at network management system (NMS) The gathered information can be used not only in optimization, but also Operators' business planning, and so on.

Accordingly, as has been described herein above, the present invention concerns a method of gathering location data of terminals in a communication network, the network comprising at least one location determination functionality adapted to determine data indicative of the location of a specified terminal within said network, and a control functionality adapted to control at least said location determination functionality, said method comprising the steps of: acquiring location data of specified terminals in response to corresponding requests from a service application, monitoring a load condition of said at least one location determination functionality resulting from said acquiring of location data of specified terminals, first detecting that said monitored load condition is below a certain threshold value, second detecting that a predetermined event concerning at least one terminal has occurred, and collecting location data of terminals in response to said second detecting.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method, comprising:
monitoring a processing load condition resulting only from acquiring location data of specified terminals within a communication network;
first detecting that said monitored processing load condition is below a threshold value;
when said monitored processing load condition is below the threshold value, initiating a second detecting for occurrence of a predetermined event concerning at least one terminal, wherein the predetermined event comprises at least one condition occurring in connection with a terminal registered or attached to the network;
collecting statistical location data of unspecified terminals in response to said second detecting; and
controlling the collecting of statistical location data so as to operate at the threshold value.

2. The method according to claim 1, further comprising:
defining said threshold value as a percentage of a maximum processing capacity of at least one location determination functionality acquiring said location data.

3. The method according to claim 2, further comprising: configuring said threshold value to be predefined and fixed.

4. The method according to claim 2, further comprising: defining said threshold value dynamically.

5. The method according to claim 4, further comprising: configuring said threshold value to vary dependent on time.

6. The method according to claim 4, further comprising: configuring said threshold value to vary dependent on the monitored load condition.

7. The method according to claim 1, further comprising: configuring said predetermined event to concern an arbitrary one of terminals registered to said network.

8. The method according to claim 1, further comprising:
providing said statistical location data of unspecified terminals for network management and optimization purposes.

9. The method according to claim 8, further comprising:
analyzing, for network management purposes, the location of terminals per event or combinations of events.

10. The method according to claim 1, further comprising:
configuring said predetermined event to comprise at least one of the following conditions
terminal requesting active set update,
terminal performing intersystem handover,
terminal performing traffic reason handover,
terminal with frequent handovers,
terminal commanded to reduce bit rate, and
terminal using a specified service.

11. The method according to claim 10, further comprising:
judging an event to have occurred if said condition is fulfilled for at least a predetermined minimum number of arbitrary terminals.

12. The method according to claim 1, further comprising:
removing terminal identification information from said collected location data of terminals so as to be represented anonymously.

13. The method according to claim 1, further comprising:
configuring said predetermined event to be the lapse of a predetermined period of time.

14. The method of claim 1, wherein the processing load condition is less than a maximum processing capacity.

15. The method of claim 1, wherein the controlling of the collection of statistical location data comprises reducing the collection of statistical location data in response to an increase in acquisition of location data of specified terminals so as to operate at the threshold value.

16. The method of claim 15, wherein the controlling of the collection of the statistical location data further comprises increasing the collection of statistical location data in response to a decrease in acquisition of location data of specified terminals.

17. An apparatus, comprising:
a monitor configured to monitor a processing load condition of at least one location determination functionality resulting only from acquiring of location data of specified terminals;
a first detector configured to detect that said monitored processing load condition is below a threshold value;
a second detector, configured to detect, in response to the first detector having detected that said monitored processing load condition is below the threshold value, an occurrence of a predetermined event concerning at least one terminal, the predetermined event comprising at least one condition occurring in connection with a terminal registered or attached to the network; and
a collection functionality configured to collect statistical location data of unspecified terminals in response to a detection of occurrence of the predetermined event; and
a controller configured to control collection of the statistical location data so as to operate at the threshold value.

18. The apparatus according to claim 17, further comprising:
a processor configured to define said threshold value as a percentage of the maximum processing capacity of said at least one location determination functionality.

19. The apparatus according to claim 18, wherein the processor is further configured to predefine and fix said threshold value.

20. The apparatus according to claim 18, wherein the processor is further configured to dynamically define said threshold value.

21. The apparatus according to claim 20, wherein the processor is further configured to vary said threshold value dependent on the monitored load condition.

22. The apparatus according to claim 18, wherein the processor is configured to define said threshold value variable dependent on time.

23. The apparatus according to claim 17, further comprising:
a processor configured to detect said predetermined event, which concerns an arbitrary one of terminals registered to said network.

24. The apparatus according to claim 17, further comprising:
a processor configured to provide said statistical location data of unspecified terminals for network management and optimization purposes.

25. The apparatus according to claim 24, wherein the processor is further configured to, for network management purposes, analyze the location of terminals per event or combinations of events.

26. The apparatus according to claim 17, further comprising:
a processor configured to detect said predetermined event, which comprises at least one of the following conditions
terminal requesting active set update,
terminal performing intersystem handover,
terminal performing traffic reason handover,
terminal with frequent handovers,
terminal commanded to reduce bit rate, and
terminal using a specified service.

27. The apparatus according to claim 26, wherein the processor is further configured to judge an event to have occurred if said condition is fulfilled for at least a predetermined minimum number of arbitrary terminals.

28. The apparatus according to claim 17, wherein the collection functionality is further configured to remove terminal identification information from said collected location data so as to be represented anonymously.

29. The apparatus according to claim 17, further comprising:
a processor configured to define said predetermined event as the lapse of a predetermined period of time.

30. The apparatus according to claim 17, wherein the processing load condition is less than a maximum processing capacity.

31. The apparatus according to claim 17, wherein the controller is configured to control collection of the statistical location data by reducing the collection of statistical location data in response to an increase in acquisition of location data of specified terminals so as to operate at the threshold value.

32. The apparatus of claim 31, wherein the controller is further configured to control collection of the statistical location data by increasing the collection of statistical location data in response to a decrease in acquisition of location data of specified terminals.

33. A computer-readable medium encoded with a computer program, the computer program configured to control a processor to perform operations comprising:
monitoring a processing load condition resulting only from acquiring of location data of specified terminals within a communication network;
first detecting that said monitored processing load condition is below a threshold value;
when said monitored processing load condition is below the threshold value, initiating a second detecting for occurrence of a predetermined event concerning at least one terminal, wherein the predetermined event comprise at least one condition occurring in connection with a terminal registered or attached to the network;
collecting statistical location data of unspecified terminals in response to said second detecting; and
controlling the collecting of statistical location data so as to operate at the threshold value.

34. An apparatus, comprising:
means for monitoring a processing load condition resulting only from acquiring of location data of specified terminals within a communication network;
means for first detecting that said monitored processing load condition is below a threshold value;
when said monitored processing load condition is below the threshold value, means for initiating a second detecting for occurrence of a predetermined event concerning at least one terminal, wherein the predetermined event comprise at least one condition occurring in connection with a terminal registered or attached to the network;
means for collecting statistical location data of unspecified terminals in response to said second detecting; and
means for controlling the collecting of statistical location data so as to operate at the threshold value.

* * * * *